United States Patent
Watson et al.

(10) Patent No.: US 6,466,226 B1
(45) Date of Patent: Oct. 15, 2002

(54) METHOD AND APPARATUS FOR PIXEL FILTERING USING SHARED FILTER RESOURCE BETWEEN OVERLAY AND TEXTURE MAPPING ENGINES

(75) Inventors: David W. Watson, Rancho Murieta; Kim A. Meinerth, Granite Bay; Indraneel Ghosh, Sunnyvale; Thomas A. Piazza, Granite Bay; Val G. Cook, Shingle Springs, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/480,156

(22) Filed: Jan. 10, 2000

(51) Int. Cl.$^7$ ................................................. G09G 5/00
(52) U.S. Cl. ........................ 345/610; 345/609; 345/629
(58) Field of Search ................................ 345/610, 609, 345/606, 629, 637, 587; 348/665

(56) References Cited

U.S. PATENT DOCUMENTS

| | | | | |
|---|---|---|---|---|
| 5,734,386 A | * | 3/1998 | Cosman | |
| 5,914,725 A | * | 6/1999 | MacInnis et al. | |
| 5,990,901 A | * | 11/1999 | Lawton et al. | |
| 6,023,302 A | * | 2/2000 | MacInnis et al. | |
| 6,184,906 B1 | * | 2/2001 | Wang et al. | ................. 345/521 |
| 6,288,730 B1 | * | 9/2001 | Duluk, Jr. et al. | .......... 345/552 |

* cited by examiner

*Primary Examiner*—Jeffery Brier
*Assistant Examiner*—Scott Wallace
(74) *Attorney, Agent, or Firm*—Antonelli, Terry, Stout & Kraus, LLP

(57) ABSTRACT

A configurable filter module for providing shared filter resource between an overlay engine and a texture mapping engine of a graphics system. The configurable filter may comprise a plurality of linear blend units each of which receives data input from one of the overlay engine and a mapping engine cache, and generates a linear blend filter output respectively; and a filter output multiplexer which receives data output from the linear blend units and selects a proper byte ordering output, wherein the linear blend units serve as an overlay interpolator filter to perform linear blending of the data input from the overlay engine during a linear blend mode, and serve as a texture bilinear filter to perform bilinear filtering of the data input from the mapping engine cache during a bilinear filtering mode.

50 Claims, 11 Drawing Sheets

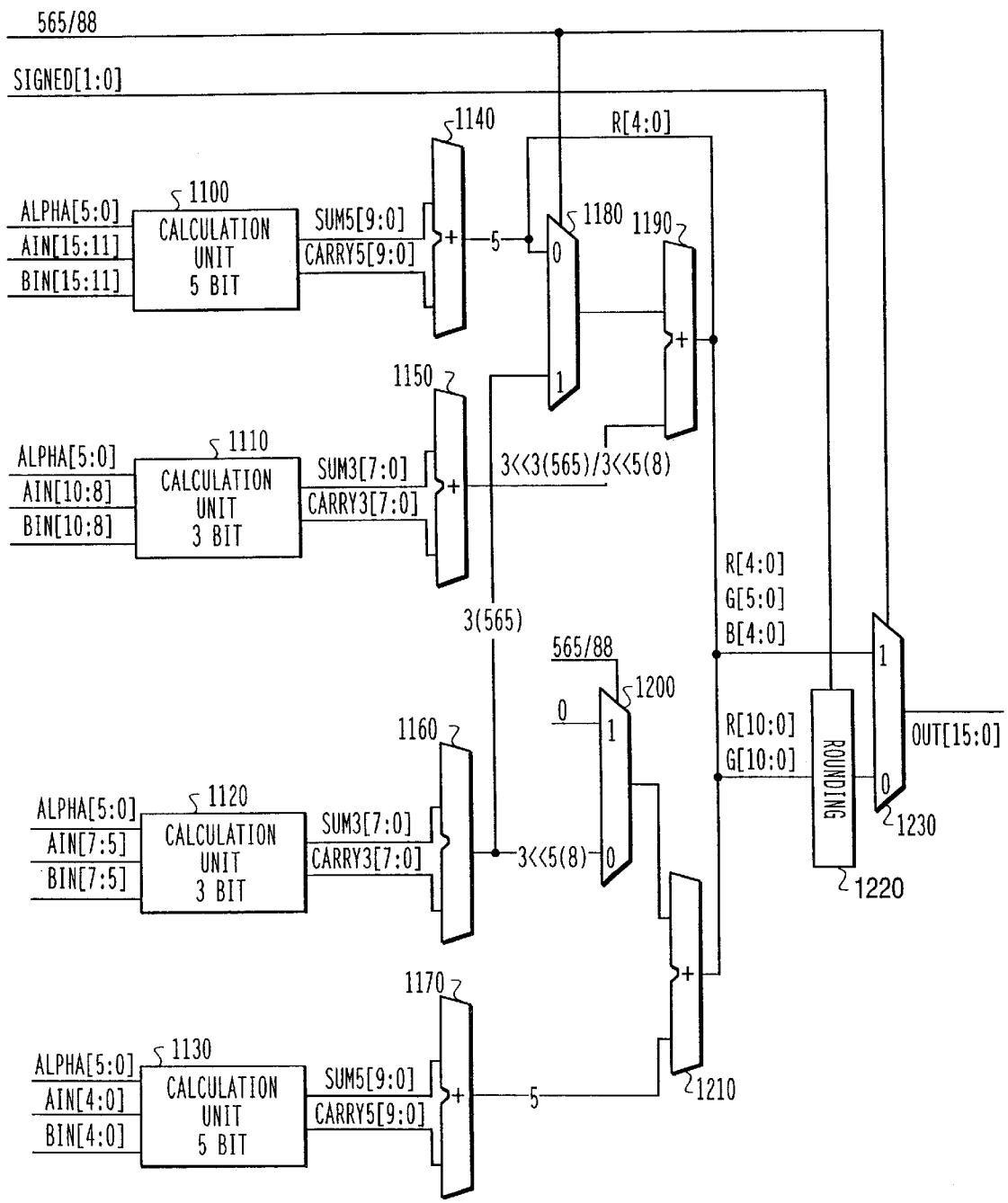

METHOD AND APPARATUS FOR PIXEL FILTERING USING SHARED FILTER RESOURCE BETWEEN OVERLAY AND TEXTURE MAPPING ENGINES

TECHNICAL FIELD

The present invention relates to computer graphics, and more particularly, relates to a method and apparatus for pixel filtering using commonly shared filter resource between an overlay engine (2D graphics engine) and a texture mapping engine (3D graphics engine) in a computer system.

BACKGROUND

A typical computer system includes a processor subsystem of one or more microprocessors such as Intel® i386, i486, Celeron™ or Pentium® processors, a memory subsystem, one or more chipsets provided to support different types of host processors for different platforms such as desktops, personal computers (PC), servers, workstations and mobile platforms, and to provide an interface with a plurality of input/output (I/O) devices including, for example, keyboards, input devices, disk controllers, and serial and parallel ports to printers, scanners and display devices. Chipsets may integrate a large amount of I/O bus interface circuitry and other circuitry onto only a few chips. Examples of such chipsets may include Intel® 430, 440 and 450 series chipsets, and more recently Intel® 810 and 8XX series chipsets. These chipsets may implement, for example, the I/O bus interface circuitry, direct memory access (DMA) controller, graphics controller, graphics memory controller, and other additional functionality such as graphics visual and texturing enhancements, data buffering, and integrated power management functions.

For graphics/multimedia applications, video data may be obtained from a video source by a graphics controller and displayed on a display monitor for viewing purposes. In traditional three-dimensional (3D) graphics systems, 3D images may be generated for representation on a two-dimensional (2D) display monitor. The 2D representation may be provided by defining a 3D model space and assigning sections of the 3D model space to pixels for a visual display on the display monitor. Each pixel may display the combined visual effects such as color, shade and transparency defined on an image.

The visual characteristics of the 2D representation of the 3D image may also be enhanced by texturing. Texture may represent changes in intensity, color, opacity, or thematic contents (such as surface material type). The process of applying texture patterns to surfaces (adding graphics to scenery) is generally referred to as "texture mapping" and is well known and widely used technique in computer graphics. The texture may be represented by a 2D array of video data. Data elements in the array are called texels and the array is called a texture map. The two coordinate axes of the texture coordinate space are defined by rows and columns of the array typically designated in "U" and "V" coordinates.

Due to various geometric considerations and physical constraints on the amount of data representative of the texture map and pixel array on the display monitor, an image, pattern or video displayed on the display monitor may be subject to visual anomalies or distortions caused by an overlay or a texture manipulation such as, for example, shrinking or enlarging textures during perspective correction. Different types of filtering techniques may be used to prevent texture distortions. For example, an overlay vertical interpolator filter may be used to filter 2D data input from an overlay engine to approximate the vertical stretch blit (block level transfer) in the 2D overlay. Separately, a bilinear texture filter may be used to filter 3D data input from a 3D engine to approximate the perspective correct shading value of a 3D triangular surface.

However, separate 2D and 3D arithmetic circuits are necessarily required at separate locations (i.e., the overlay engine and the 3D engine) to perform the 2D overlay stretch blit and the 3D texture cache functions. These arithmetic circuits can be burdensome and cost-prohibitive. In addition, separate linear interpolators are also required for different data formats to calculate multiple color resolutions.

Accordingly, a need exists for a cost-effective filter solution with less hardware to eliminate the need to create separate 2D and 3D arithmetic circuits for the 2D overlay stretch blit and the 3D texture cache functions, and separate linear interpolators for different data formats for multiple color resolutions.

SUMMARY

Accordingly, various embodiments of the present invention are directed to a configurable filter module for providing commonly shared filter resource between an overlay engine and a texture mapping engine of a graphics system. Such a filter module may comprise a plurality of linear blend units each of which receives data input from one of the overlay engine and a mapping engine cache, and generates a linear blend filter output respectively; a filter output multiplexer which receives data output from the linear blend units and selects a proper byte ordering output, wherein the linear blend units serve as an overlay interpolator filter to receive data input from the overlay engine for a linear blending function during a linear blend mode, and serve as a texture bilinear filter to receive data input from the mapping engine cache for a texture bilinear filtering function during a bilinear filtering mode.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein:

FIG. 11 illustrates a block diagram of an example dual linear blend unit (DLBU) for use in an example shared filter module according to an embodiment of the present invention.

DETAILED DESCRIPTION

The present invention is applicable for use with all types of computer systems, processors, video sources and chipsets, including follow-on chip designs which link together work stations such as computers, servers, peripherals, storage devices, and consumer electronics (CE) devices for audio and video communications. The video sources may include video storage media, video equipments and/or video consumer electronics (CE) devices. Examples of such consumer electronics (CE) devices may include digital video discs (DVD), audio compact discs (CD), videotapes, laser discs, CD-ROMs (read only memory), digital video cameras, digital still cameras, HD-TVs, satellite networks, cable networks, video cassette recorders (VCR), printers, scanners, imaging systems and cellular systems and those CE devices which may become available as technology advances in the future. However, for the sake of simplicity, discussions will concentrate mainly on a computer system having a basic graphics/multimedia platform architecture of multi-media engines executing in parallel to deliver high performance video capabilities, although the scope of the present invention is not limited thereto. The term "graphics" may include, but may not be limited to, computer-generated images, symbols, visual representations of natural and/or synthetic objects and scenes, pictures and text.

Figure 1:
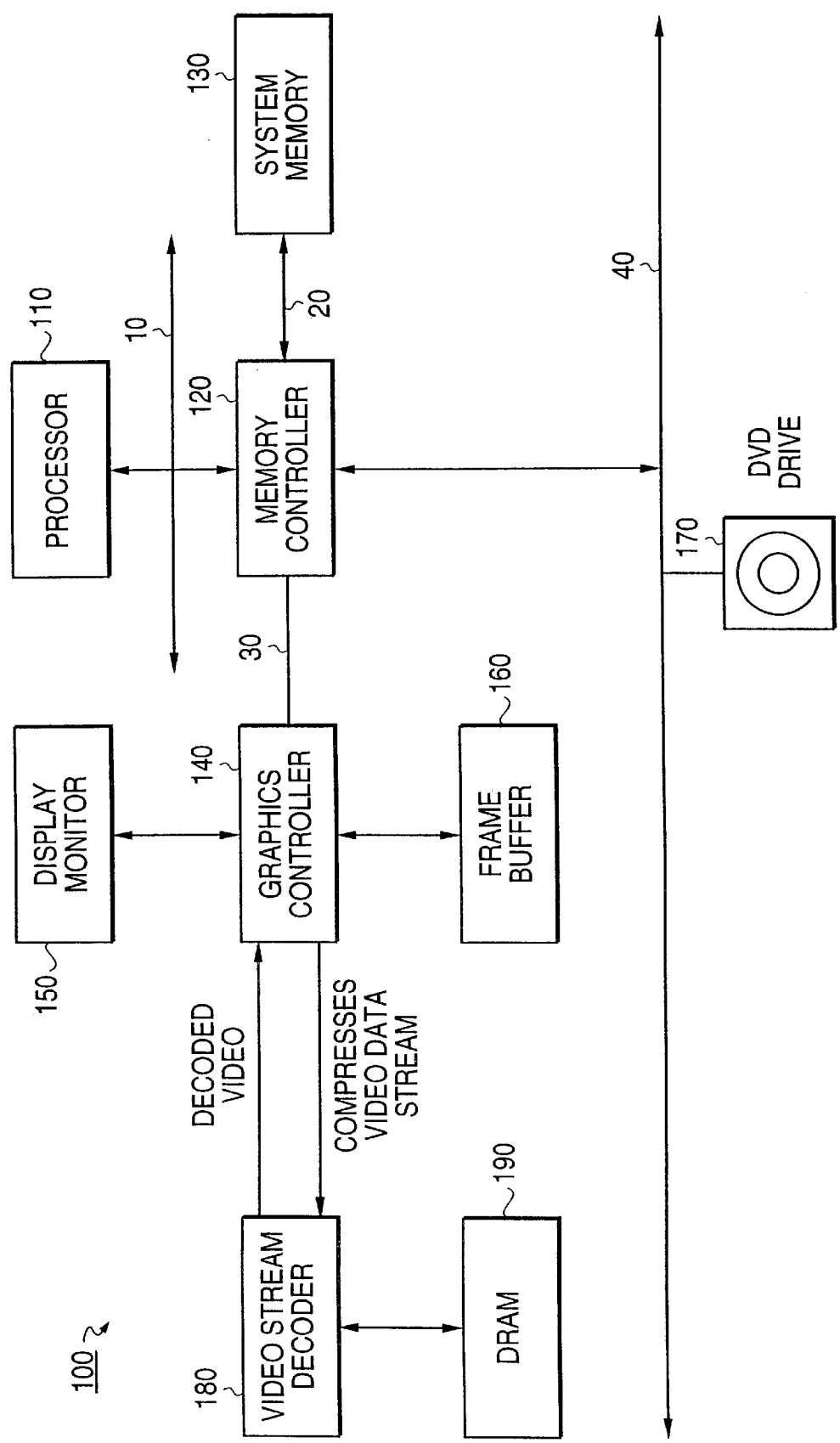
FIG. 1 illustrates a block diagram of an example computer system having a graphics/multimedia platform of multi-media engines according to an embodiment of the present invention.

Attention now is directed to the drawings and particularly to FIG. 1, an example computer system 100 having a graphics/multimedia platform of multi-media engines according to an embodiment of the present invention is illustrated. The computer system 100 (which can be a system commonly referred to as a personal computer or PC) may include one or more processors or central processing units (CPU) 110 such as Intel® i386, i486, Celeron™ or Pentium® processors, a memory controller 120 connected to the CPU 110 via a front side bus 10, a system memory 130 connected to the memory controller 120 via a memory bus 20, a graphics controller 15 140 connected to the memory controller 120 via a graphics bus (e.g., Advanced Graphics Port "AGP" bus) 30.

Alternatively, the graphics controller 140 may also be configured to access the memory controller 120 via a peripheral bus such as a peripheral component interconnect (PCI) bus 40, if so desired. The PCI bus may be a high performance 32 or 64 bit synchronous bus with automatic configurability and multiplexed address, control and data lines as described in the latest version of "PCI Local Bus Specification, Revision 2.1" set forth by the PCI Special Interest Group (SIG) on Jun. 1, 1995 for added-on arrangements (e.g., expansion cards) with new video, networking, or disk memory storage capabilities. The graphics controller 140 controls a visual display of graphics and/or video images on a display monitor 150 (e.g., cathode ray tube, liquid crystal display and flat panel display). The display monitor 150 can be either an interlaced or progressive monitor, but typically is a progressive display device. A frame buffer 160 may be coupled to the graphics controller 140 for buffering the data from the graphics controller 140, CPU 110, or other devices within the computer system 100 for a visual display of video images on the display monitor 150.

A digital video disc (DVD) drive 170 is connected to the memory controller 120 via the PCI bus 40. The DVD drive 170 may be configured to read data from any one of a number of currently available DVDs. For example, the DVD may be a DVD-Video disc for displaying a movie onto the display monitor 150. Alternatively, the DVD may be a DVD-ROM disc having a computer program stored thereon in order to run the program on the computer system 100. Since the present invention is directed to displaying DVD-Video on the display monitor 150, all references hereinafter to DVD may pertain to DVD-Video.

In the described embodiment, video and audio data from the DVD may be obtained in compressed format. The DVD may store both progressive and interlaced video content in a compressed format in accordance with a standard developed by the Motion Picture Experts Group (MPEG) for use with audio-video data (e.g., MPEG-1, MPEG-2 and MPEG-4). For example, a complete description of the MPEG-2 standard can be found in "*Information Technology—Generic Coding of moving Pictures and Associated Audio Information: Video*" published by the International Organization for Standardization (ISO) and the International Electrotechnical Commission (IEC); ISO-IEC 13818-2; May 15, 1996. However, the standard formats need not be limited to MPEG-2; other standards for use with audio-video data may also be readily utilized.

A video stream decoder 180 is connected to the graphics controller 140 and receives the compressed video data stream from the DVD drive 170. The video stream decoder 180 buffers the compressed video data stream in a dynamic random access memory (DRAM) 190, which is coupled to the video stream decoder 180. Although a DRAM is preferred for the speed, other storage devices such as a read-only-memory (ROM) and video random-access-memory (VRAM) may be utilized for the memory 190. The video stream decoder 180 then retrieves the video data from the memory 190 as needed and decompresses and decodes the video data. The decoded video data is output to the graphics controller 140 for processing and eventual display on the display monitor 150.

In another embodiment of the present invention, the memory controller 120 and the graphics controller 140 can be integrated as a single graphics and memory controller hub (GMCH) including dedicated multi-media engines executing in parallel to deliver high performance 3D, 2D and motion compensation video capabilities. The GMCH may be implemented as a PCI chip such as, for example, PIIX4® chip and PIIX6® chip manufactured by Intel Corporation. In addition, such a GMCH may also be implemented as part of a host chipset along with an I/O controller hub (ICH) and a firmware hub (FWH) as described, for example, in Intel® 810 and 8XX series chipsets.

Figure 2:
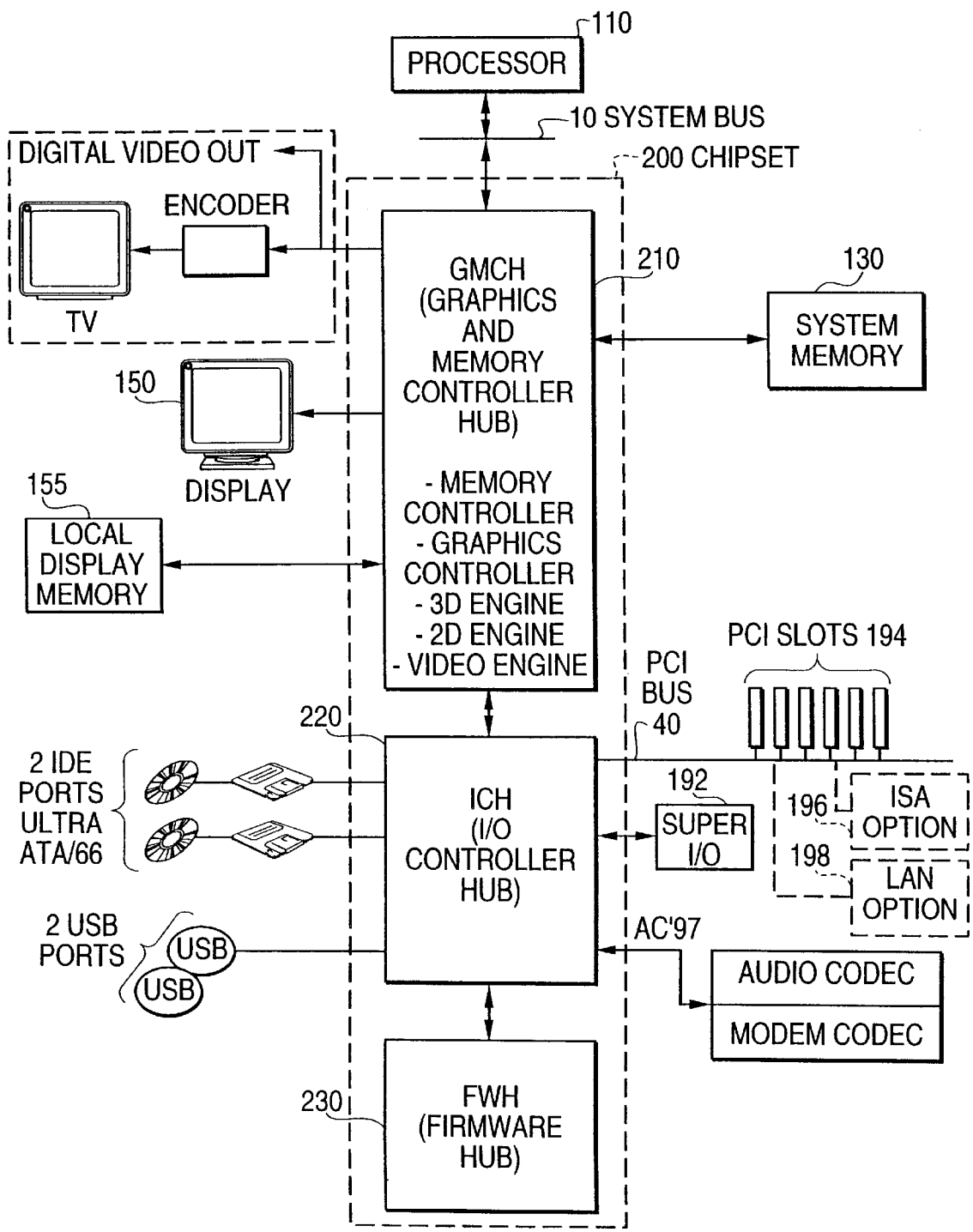
FIG. 2 illustrates a block diagram of an example computer system having a host chipset for providing a graphics/multimedia platform according to an embodiment of the present invention.

FIG. 2 illustrates an example computer system 100 including such a host chipset 200 according to an embodiment of the present invention. As shown in FIG. 2, the computer system 100 includes essentially the same components shown in FIG. 1, except for the host chipset 200 which provide a highly-integrated three-chip solution consisting of a graphics and memory controller hub (GMCH) 210, an input/output (I/O) controller hub (ICH) 220 and a firmware hub (FWH) 230.

The GMCH 210 provides graphics and video functions and interfaces one or more memory devices to the system bus 10. The GMCH 210 may include a memory controller as well as a graphics controller (which in turn may include a 3D engine, a 2D engine, and a video engine). GMCH 210 may be interconnected to any of a system memory 130, a local display memory 155, a display monitor 150 (e.g., a computer monitor) and to a television (TV) via an encoder and a digital video output signal. GMCH 210 maybe, for example, an Intel® 82810 or 82810-DC100 chip. The GMCH 210 also operates as a bridge or interface for communications or signals sent between the processor 110 and one or more I/O devices which may be connected to an ICH 220.

The ICH 220 interfaces one or more I/O devices to GMCH 210. FWH 230 is connected to the ICH 220 and provides firmware for additional system control. The ICH 220 may be for example an Intel® 82801 chip and the FWH 230 may be for example an Intel® 82802 chip.

The ICH 220 may be connected to a variety of I/O devices and the like, such as: a Peripheral Component Interconnect (PCI) bus 40 (PCI Local Bus Specification Revision 2.2) which may have one or more I/O devices connected to PCI slots 194, an Industry Standard Architecture (ISA) bus option 196 and a local area network (LAN) option 198; a Super I/O chip 192 for connection to a mouse, keyboard and other peripheral devices (not shown); an audio coder/decoder (Codec) and modem Codec; a plurality of Universal Serial Bus (USB) ports (USB Specification, Revision 1.0); and a plurality of Ultra/66 AT Attachment (ATA) 2 ports (X3T9.2 948D specification; commonly also known as Integrated Drive Electronics (IDE) ports) for receiving one or more magnetic hard disk drives or other I/O devices.

The USB ports and IDE ports may be used to provide an interface to a hard disk drive (HDD) and compact disk read-only-memory (CD-ROM). I/O devices and a flash memory (e.g., EPROM) may also be connected to the ICH of the host chipset for extensive I/O supports and functionality. Those I/O devices may include, for example, a keyboard controller for controlling operations of an alphanumeric keyboard, a cursor control device such as a mouse, track ball, touch pad, joystick, etc., a mass storage device such as magnetic tapes, hard disk drives (HDD), and floppy disk drives (FDD), and serial and parallel ports to printers and scanners. The flash memory may be connected to the ICH of the host chipset via a low pin count (LDC) bus. The flash memory may store a set of system basic input/output start up (BIOS) routines at startup of the computer system 100. The super I/O chip 192 may provide an interface with another group of I/O devices.

One or more speakers are typically connected to the computer system for outputting sounds or audio information (speech, music, etc.). According to an embodiment, a compact disc(CD) player or preferably a Digital Video Disc (DVD) player is connected to the ICH 130 via one of the I/O ports (e.g., IDE ports, USB ports, PCI slots). The DVD player uses information encoded on a DVD disc to provide digital audio and video data streams and other information to allow the computer system to display and output a movie or other multimedia (e.g., audio and video) presentation.

Figure 3:
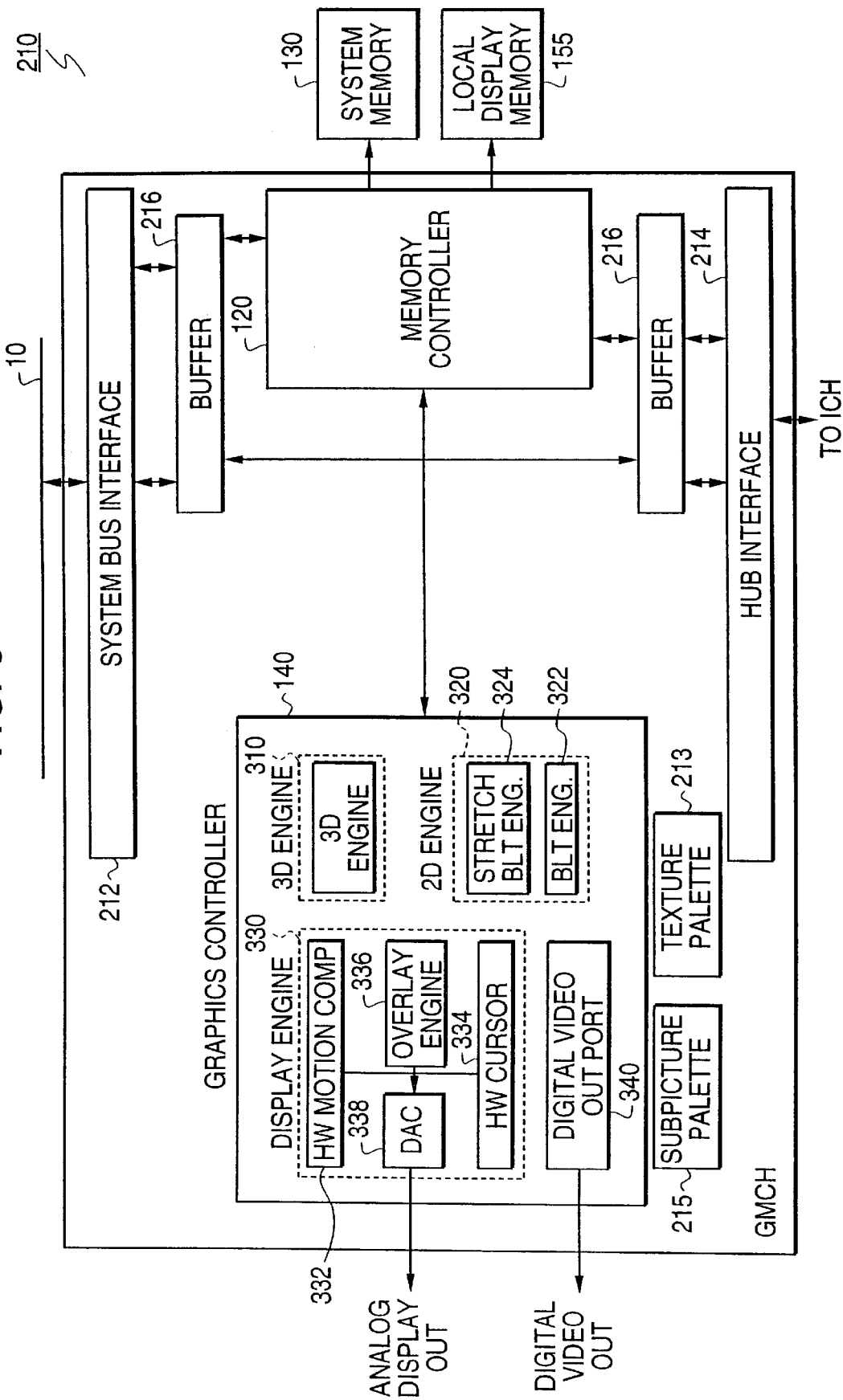
FIG. 3 illustrates a functional diagram of an example graphics and memory controller hub (GMCH) according to an embodiment of the present invention.

FIG. 3 illustrates a block diagram of a graphics and memory controller hub (GMCH) 210 according to an example embodiment of the present invention. The GMCH 210 may include a graphics controller 140 to provide graphics and video functions and a memory controller 120 to control and interface one or more memory devices via the system bus 10. Memory controller 120 may be connected to the system bus 10 via a buffer 216 and a system bus interface 212. The memory controller 120 may also be connected to the ICH 220 via a buffer 216 and a hub interface 214. In addition, the GMCH 210 may be connected to a system memory 130 and, optionally, a local display memory 155 (also commonly referred to as video or graphics memory typically provided on a video card or video memory card). In a cost saving unified memory architecture (UMA), the local display memory 155 may be reside in the computer system. In such an architecture, the system memory 130 may operate as both system memory and the local display memory.

The graphics controller 140 of the GMCH 210 may include a 3D (texture mapping) engine 310 for performing a variety of 3D graphics functions, including creating a rasterized 2D display image from representation of 3D objects, a 2D engine 320 for performing 2D functions, a display engine 330 for displaying video or graphics images, and a digital video output port 340 for outputting digital video signals and providing connection to traditional TVs or new space-saving digital flat panel display.

The 3D (texture mapping) engine 310 performs a variety of functions including perspective-correct texture mapping to deliver 3D graphics without annoying visual anomalies such as warping, bending or swimming, bilinear and anisotropic filtering to provide smoother and more realistic appearance 3D images, MIP mapping to reduce blockiness and enhance image quality, Gouraud shading, alpha-blending, fogging and Z-buffering.

The 2D engine 320 includes a blitter (BLT) engine 322 and an arithmetic stretch blitter (BLT) engine 324 for performing fixed blitter and stretch blitter (BLT) operations, which refer to a block transfer of pixel data between memory locations.

The display engine 330 includes a hardware motion compensation module 332 for performing motion compensation to improve video quality, a hardware cursor 334 for providing cursor patterns, an overlay engine 336 for merging either video data captured from a video source or data delivered from the 2D engine 320 with graphics data on the display monitor 150, and a digital-to-analog converter (DAC) 338 for converting digital video to analog video signals (YUV color space to RGB color space) for a visual display on the display monitor 150. The hardware motion compensation module 332 may alternatively reside within the 3D engine 310 for purposes of simplicity.

A texture palette 213, also known as a color lookup table (CLUT), may be provided within GMCH 210 to identify a subset from a larger range of colors. A small number of colors in the palette 215 allows fewer bits to be used to identify the color or intensity of each pixel. The colors for the textures are identified as indices to the texture palette 215. In addition, a subpicture palette 215 may separately be provided for color alpha-blending subpicture pixels for transparency. However, a single dual-purpose palette may be used as both a texture palette and a subpicture palette to save hardware and reduce costs. The alpha-blending of the subpicture with video is an operation typically associated with DVD processing, while texturing is typically associated with 3D processing. In most cases, the computer system may not perform both 3D texturing and alpha-blending at the same time (e.g., DVD videos and 3D games are not typically running at the same time on a computer system).

Figure 4:
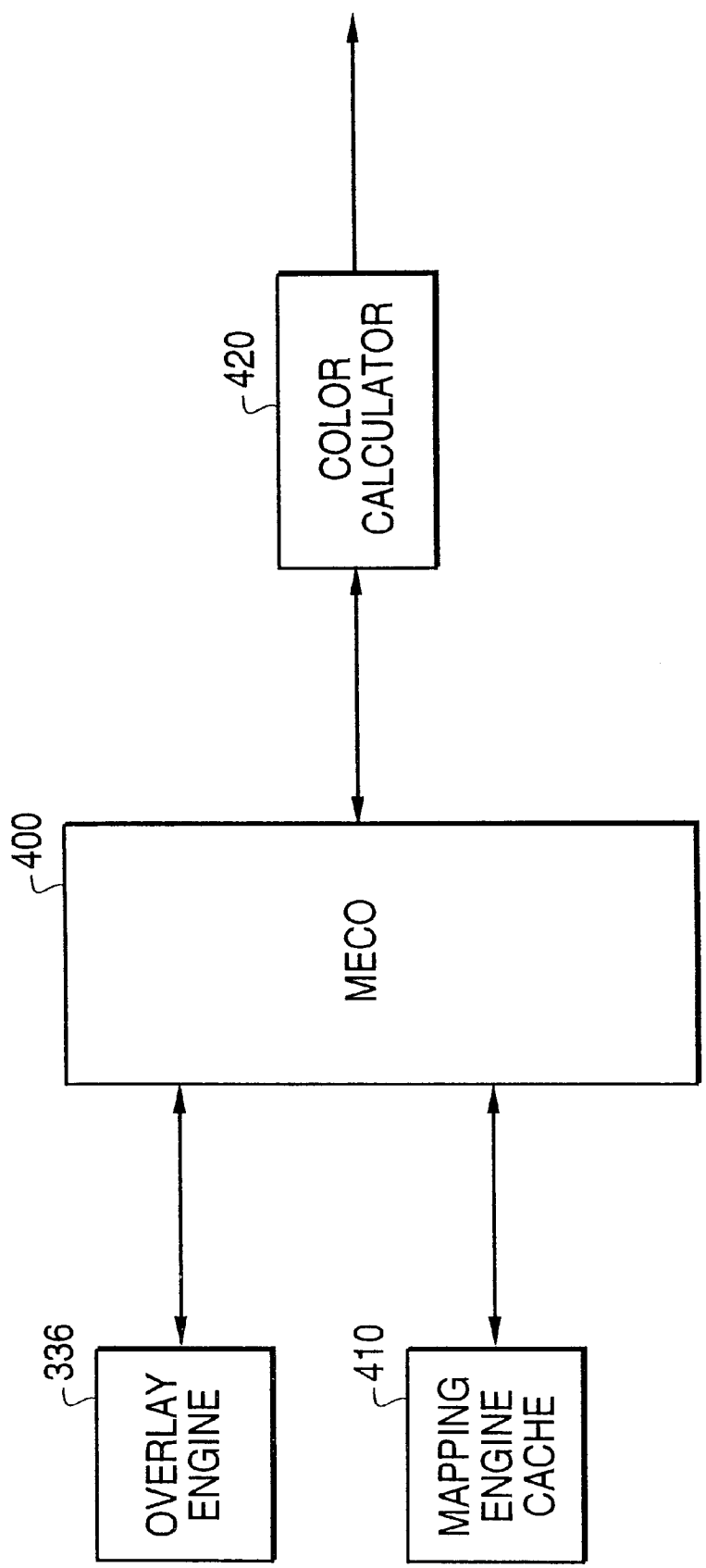
FIG. 4 illustrates a top level I/O interconnect diagram of an example mapping engine cache output (MECO) unit for pixel filtering and providing shared filter resource functionality between an overlay engine and a 3D (texture mapping) engine according to an embodiment of the present invention.

Turning now to FIG. 4, a top level I/O interconnect diagram of an example mapping engine cache output (MECO) unit 400 for pixel filtering and providing shared filter resource functionality between an overlay engine 336 and a 3D (texture mapping) engine 310 according to an embodiment of the present invention is illustrated. The MECO unit 400, a mapping engine cache 410 and a color calculator 420 may reside in the 3D engine 310 and form a texture pipeline within the 3D engine 310. The MECO unit 400 has an interface directly with the 2D engine 320 for receiving 2D inputs (64 bits A & B data input: pixels) from the 2D engine 320 through the overlay engine 336. The mapping engine cache 410 provides 3D inputs (16 bits A & B data input: texels) from the setup stage of the 3D (texture mapping) engine 310 to the MECO unit 400.

Figure 5:
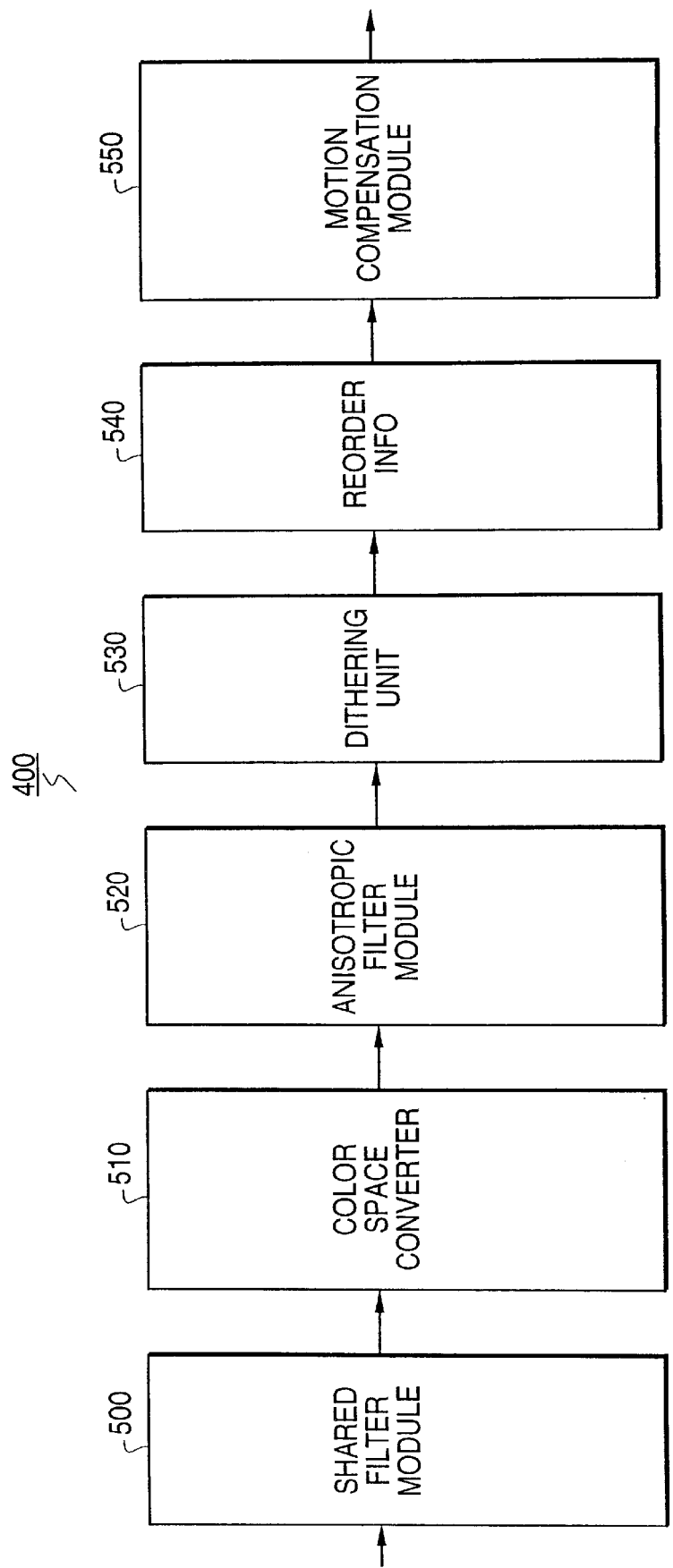
FIG. 5 illustrates a block diagram of an example mapping engine cache output (MECO) unit for pixel filtering and providing shared filter resource functionality between an overlay engine and a 3D (texture mapping) engine according to an embodiment of the present invention.

FIG. 5 illustrates a block diagram of an example mapping engine cache output (MECO) unit 400 for pixel filtering and providing time-domain shared filter resource functionality between an overlay engine and a 3D (texture mapping) engine according to an embodiment of the present invention. As shown in FIG. 5, the MECO unit 400 contains a shared filter module 500 for providing commonly shared filter resource functionality between the overlay engine 336 and the 3D (texture mapping) engine 310, and following downstream units, including, for example, a color space converter 510, an anisotropic filter module 520, a dithering unit 530, a re-order FIFO 540, and a motion compensation module 550. The shared filter module 500 may be a re-configurable filter intended to serve as either an overlay interpolator (Overlay Vertical Stretch Blit) filter for linear blending 2D inputs from a 2D engine 320 through an overlay engine 336, or a bilinear texture filter for bilinear filtering 3D inputs from a 3D engine 310. The reconfigurable filter is designed to advantageously eliminate the need to create separate 2D and 3D arithmetic circuits for the 2D overlay stretch blit and the 3D texture cache functions. In either filter configuration, the shared filter module 400 may be utilized to bi-linear color values to approximate the perspective correct shading value of a 3D triangular surface and the vertical stretch blit in the 2D overlay. However, the shared filter module 500 can only service one module function at a time. Arbitration maybe required between the overlay engine 336 and the texture mapping engine cache 410 with overlay assigned the highest priority.

The color space converter 510 receives YUV data and converts the same into RGB data. YUV represents color-difference video data containing one luminance component (Y) and two chrominance components (U, V). YUV may also be referred to as YCrCb (where Cr and Cb are chrominance values corresponding to U and V). Thus the terms YUV and YCrCb may be used interchangeably hereinbelow. In contrast to YUV, RGB represents composite video data containing red (R), green (G) and blue (B) components.

The anisotropic filter module 520 sums four pixels from different levels-of-detail (LOD) levels ranging, for example, from 1024×1024 to 1×1 texels, and then averages them to produce an average of four LOD levels. Data is received from the color space converter 510 accumulated over the next three data cycles to accumulate a total of four texels. When four texels have been accumulated, the value may be averaged to produce the final result and the corresponding valid signal may be activated to indicate the completion.

The dithering unit 530 reads dither weights from a table and sums the dither weights with the current pixel data received from the anisotropic filter module 520. The re-ordering FIFO 540 properly sorts pixels for the proper output format. The motion compensation module 550 then averages two pixels (the previous and future pixel values) and sums an error term with the averaged result. Finally, the motion compensation module 550 sends data to the color calculator 420 (see FIG. 4) for handling final color calculations that the texture map may contain, that is, blending the shading with the texture maps to process the texels before rendering on the display monitor 150.

The shared filter module 500 uses a gate saving optimization based on the linear blend equation as follows:

$$A+\alpha(B-A)$$

where A represents either first 64 bit or 16 bit data input, and B represents either second 64 bit or 16 bit data input. The linear blend equation may expand to:

$$A+\alpha B-\alpha A$$

rearranging terms:

$$A-\alpha A+\alpha B$$

factoring out A from the first two terms:

$$A(1-\alpha)+\alpha B$$

complement alpha and remove the minus sign:

$$A(1+\overline{\alpha})+\alpha B$$

multiply parenthesis quantity by A finally yields:

$$A+\overline{\alpha}A+\alpha B$$

Based on the linear blend equation, a multiply-free linear blend unit (LBU) may be created. The optimization may be accomplished by noting that a binary multiplication can be achieved by summing the multiplicand by itself shifted by the bit position of any active bits (bits containing 1) in t he multiplier. In this situation, A will be selected when B is not. This allows selection of A or B as inputs to the master summer of the multiply, thus reducing the number of terms to ½ that would normally be required. In order to support two data formats, 565 pixel grouping (5 bits of red value, 6 bits of green value and 5 bits of blue value) or a 88 pixel grouping, the linear blend unit (LBU) may split into a three-bit multiply section and a five bit multiply section. Two of these split linear blend units may be combined into a dual linear blend unit (DLBU) with the capability of operating in an 88 resolution format or a 565 resolution format. Four such dual linear blend units (DLBU) plus one single linear blend unit (LBU) may be required for all pixel/texel formats. All filter modes may be controlled by filter inputs, such as an "OvalidIn" signal from the overlay engine 336 and a "565/88" filter mode select signal from the mapping engine cache (MEC) 410. The following modes of filtering are required: 1) overlay vertical interpolator filtering, and 2) bilinear texture filtering. In order to support all the precision needed by the downstream dithering unit 530 (see FIG. 5), the last dual linear blend unit (DLBU) may carry 24 bit precision out for RGB (eight bit precision for each R,G and B) dithering inputs. All other linear blend units (both dual and single) only carry eight bits of precision for 8 bit modes and split the precision to 565 for RGB.

Figure 6:
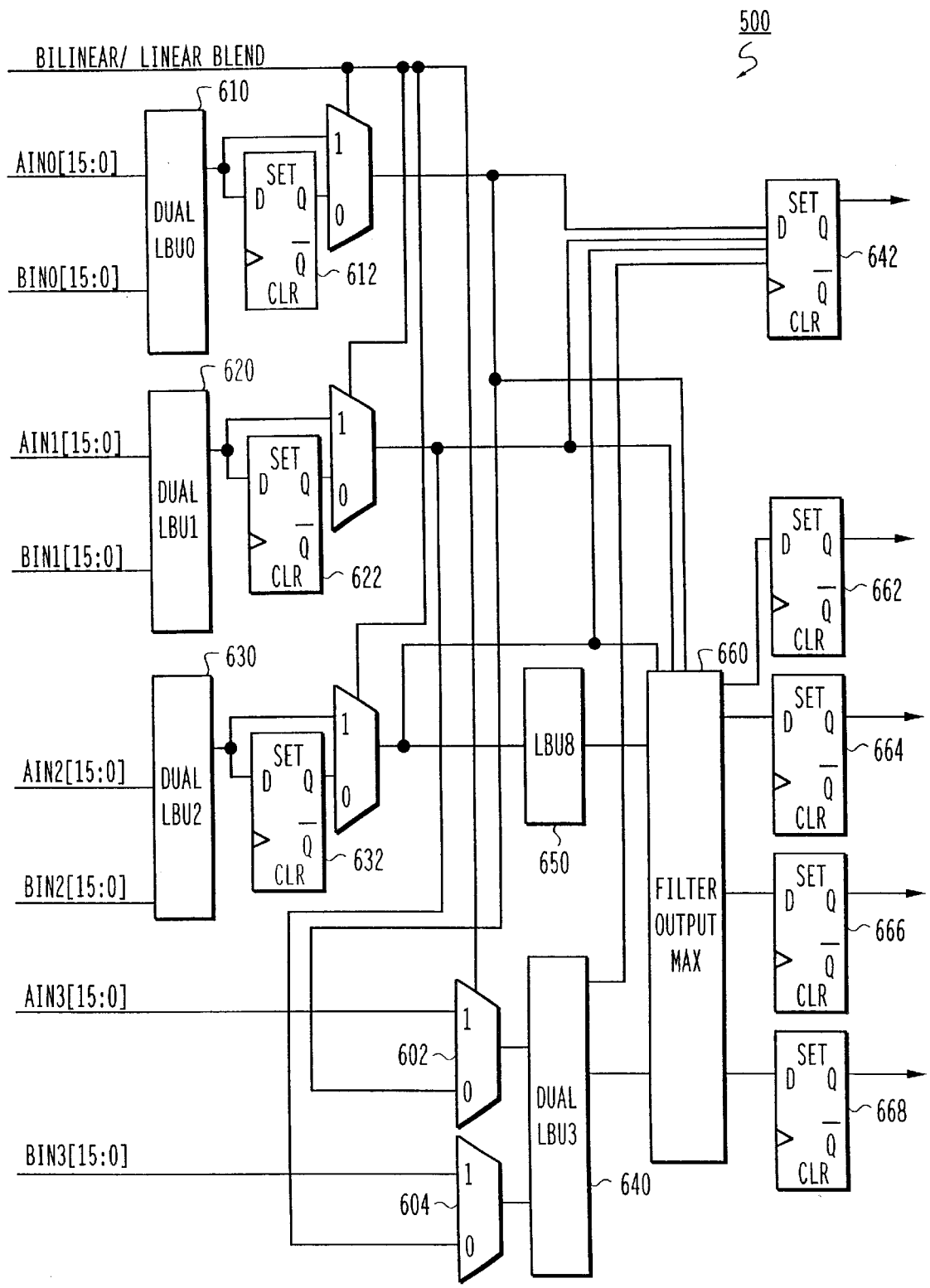
FIG. 6 illustrates a block diagram of an example shared filter module for providing shared filter resource functionality between an overlay engine and a 3D (texture mapping) engine according to an embodiment of the present invention.

FIG. 6 illustrates a block diagram of an example shared filter module 500 for providing commonly shared filter resource functionality between an overlay (2D) engine and a texture mapping (3D) engine according to an embodiment of the present invention. As shown in FIG. 6, the shared filter module 500 may comprise a plurality of linear blend units 610, 620, 630, 640 and 650 which receive 64 bit (2D) or 16 bit (3D) A & B data input from either an overlay engine 336 or a mapping engine cache (MEC) 410, and generate dual linear blend filter output respectively, via respective registers 612, 622, 632, and 642, and a filter output multiplexer 660 which receives data output from the linear blend units 610, 620, 630, 640 and 650 and selects the proper byte ordering for the downstream units, i.e., the color space converter 510 via registers 662, 664, 666 and 668. There may be nine linear blend units used to form the shared filter module 500 (four dual linear blend units (LBU0–LBU3) and a single linear blend unit (LBU8)). Each dual linear blend unit (LBU0–LBU3) is designed to support two data formats, for example, 565 and 88 configurations. Each dual linear blend unit (LBU0–LBU3) may be configured as two split linear blend units or three split linear blend units and the associated circuitry to support both data formats. Dual linear blend unit (LBU3) 640 may be arranged to receive 64 bit (2D) or 16 bit (3D) A & B data input via selectors 602 and 604 under control of a filter mode signal (bilinear/linear blend control bits). In contrast to the dual linear blend unit (LBU0–LBU3), the single linear blend unit (LBU8) supports only one data format, that is the 88 configuration. In either blend unit, rounding circuitry may be provided to round away from zero with signed data.

The shared filter module 500 has two basic modes of operation: a linear blend mode implementing the linear blend equation A+alpha(B-A), and a bilinear mode implementing bilinear filtering function. When operated in the linear blend mode, the shared filter module 500 serves as an overlay interpolator (Overlay Vertical Stretch Blit) filter which receives 2D input data from the overlay engine 336. 2D input data may consist of overlay surface A, overlay surface B, alpha, a request for filter signal and a signed signal. The function A+alpha(B-A) is calculated and the result is returned to the overlay engine 336. Nine linear blend units of the shared filter module 500 act as linear interpolators. Nine such linear interpolators may be required for all formats supported. The linear interpolator contains the following: the A and B data input may be eight bits unsigned for Y and −128 to 127 in two's complement for U and V. Precision for alpha may be six bits. All calculations may be rounded away from zero. Data formats supported for pixels may include 1555, 565 and 88 color formats. Vertical stretch blit can produce one 64 bit quantity per clock.

When operated in the bilinear mode, the shared filter module 500 serves as a texture bilinear filter to receive 3D input data from the mapping engine cache 410. 3D input data may consist of texels. Bilinear filtering may be accomplished on texels using the equation: C=C1(1.u)(1-.v) +C2 (.u(1-.v))+C3 (.u*.v)+C4(1-.u)*v, where C1, C2,C3 and C4 are the four adjacent texels making up the locations U-V, U+1-V, U-V+1 and U+1-V+1. The values .u and .v are the fractional locations within the C1, C2, C3, C4 texels. Data formats supported for texels may include 1555 ARGB, 0565 ARGB and 4444 ARGB color formats, where A is alpha. Color spaces of YUV and RGB are also supported. Texel 1555, 565 and 4444 produce one 16 bit quantity (i.e. 1555, 565 or 4444) per clock.

The nine linear blend units of the shared filter module 500 (four dual linear blend units (LBU0–LBU3) and a single linear blend unit (LBU8)) can be configured as either 8 eight bit linear interpolators, 3 eight bit bi-linear interpolators or 4 555 bi-linear interpolators for operation in either a linear blend mode implementing the linear blend equation A+alpha (B-A) or a bilinear mode in different data formats. These data formats include, for example: (1) Texel 1555, Texel 4444, and Texel 565; (2) Overlay 565; (3) Overlay YUV; and (4) YUV 4:2:0/4:2:2. Texel 1555, Texel 4444, Texel 565, and YUV 4:2:0/4:2:2 format require the bilinear filter configuration, whereas the Overlay 565 and Overlay YUV require the linear blending configuration.

Control bits (bilinear/linear blend) determine the filter configuration of the shared filter module 500. An overlay valid data signal may be used to control the arbitration and selection of the filter owner (i.e., overlay and texture). Arbitration may be performed between the overlay stretch blit and the texture cache functions. The overlay maintains the highest priority and the texture cache may be assigned the lowest (two state priority). When valid overlay is present (determined by the overlay valid signal) the overlay engine 336 owns the filter operation of the shared filter module 500 until the overlay valid signal is no longer asserted. During this time the texture pipeline within the 3D engine 310 freezes (if any) current operations and waits until the overlay engine 336 has completed use of the shared filter module 500.

Figure 7:
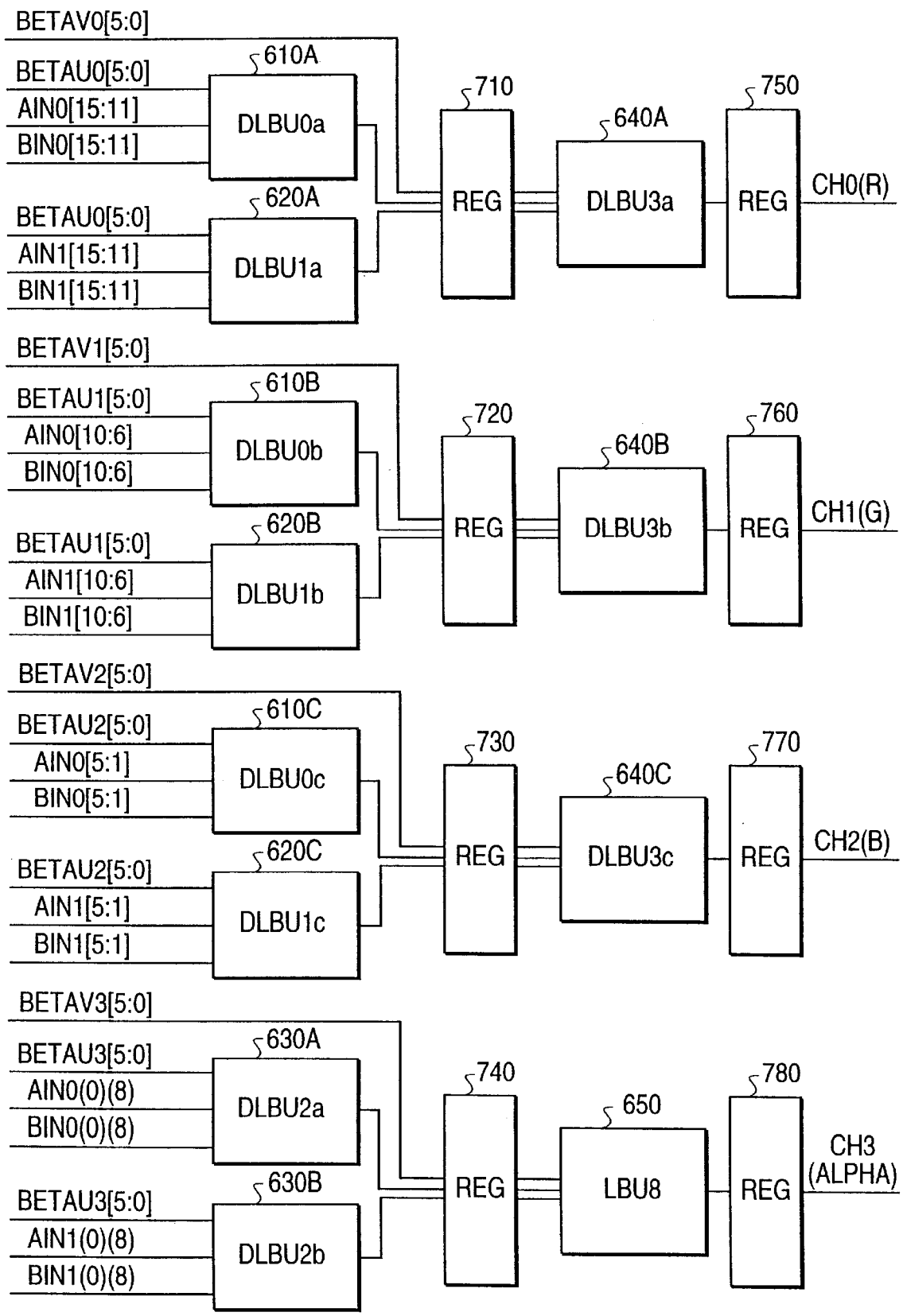
FIG. 7 illustrates a filter configuration diagram of an example shared filter module when configured for operation in Texel 1555 mode, Texel 4444 mode and Texel 565 mode according to an embodiment of the present invention.

FIG. 7 illustrates a filter configuration diagram of an example shared filter module 500 when configured for bilinear filter operation in Texel 1555 mode and Texel 4444 mode according to an embodiment of the present invention. As shown in FIG. 7, each of the dual linear blend units (LUB0–3) of the shared filter module 500 may be configured as three linear blend units 610A–610C, 620A–620C, and 640A–640C, and two linear blend units 630A–630B. Dual linear blend units (BLU0, BLU1 and BLU3) 610A–610C, 620A–620C and 640A–640C are configured for bi-linear filtering of A & B data input from the mapping engine cache 410 to approximate perspective correct shading value of a 3D triangular surface for a 565 resolution format. In contrast to BLU0, BLU1 and BLU3, the dual linear blend unit (LBU2) 630A–630B and the single LBU 650 are configured for bi-linear filtering of A & B data input from the mapping engine cache 410 to approximate perspective correct shading value of a 3D triangular surface for a 88 resolution format. Registers 710–780 may be provided to control operation of the filter configuration. As for Texel 565 mode, the dual linear blend units (BLU0, BLU1 and BLU3) 610A–610C, 620A–620C and 640A–640C are configured for bi-linear filtering of A & B data input from the mapping engine cache 410 to approximate perspective correct shading value of a 3D triangular surface for a 565 resolution format. However, the dual LUB2 630A–630B and the single LBU 650 may not be used.

Figure 8:
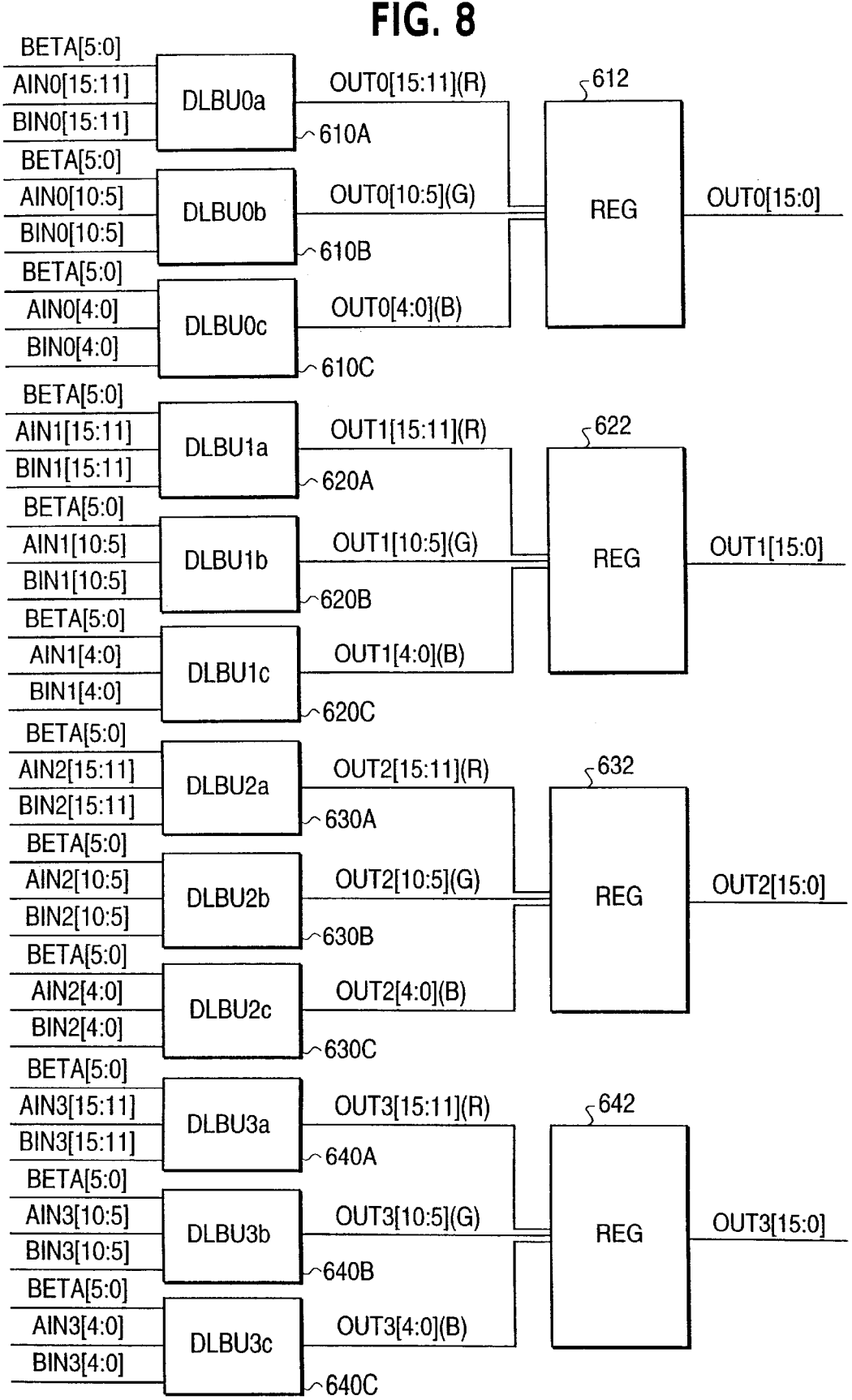
FIG. 8 illustrates a filter configuration diagram of an example shared filter module when configured for operation in Overlay 565 mode according to an embodiment of the present invention.

FIG. 8 illustrates a filter configuration diagram of an example shared filter module 500 when configured for operation in Overlay 565 mode according to an embodiment of the present invention. As shown in FIG. 8, all dual linear blend units (LUB0-3) of the shared filter module 500 may be configured as three linear blend units 610A–610C, 620A–620C, 630A–630C and 640A–640C for linear blending A & B data input from the overlay engine 336 to approximate perspective correct shading value of a 3D triangular surface for a 565 resolution format. Registers 612, 622, 632 and 642 may be provided to control operation of the filter configuration.

Figure 9:
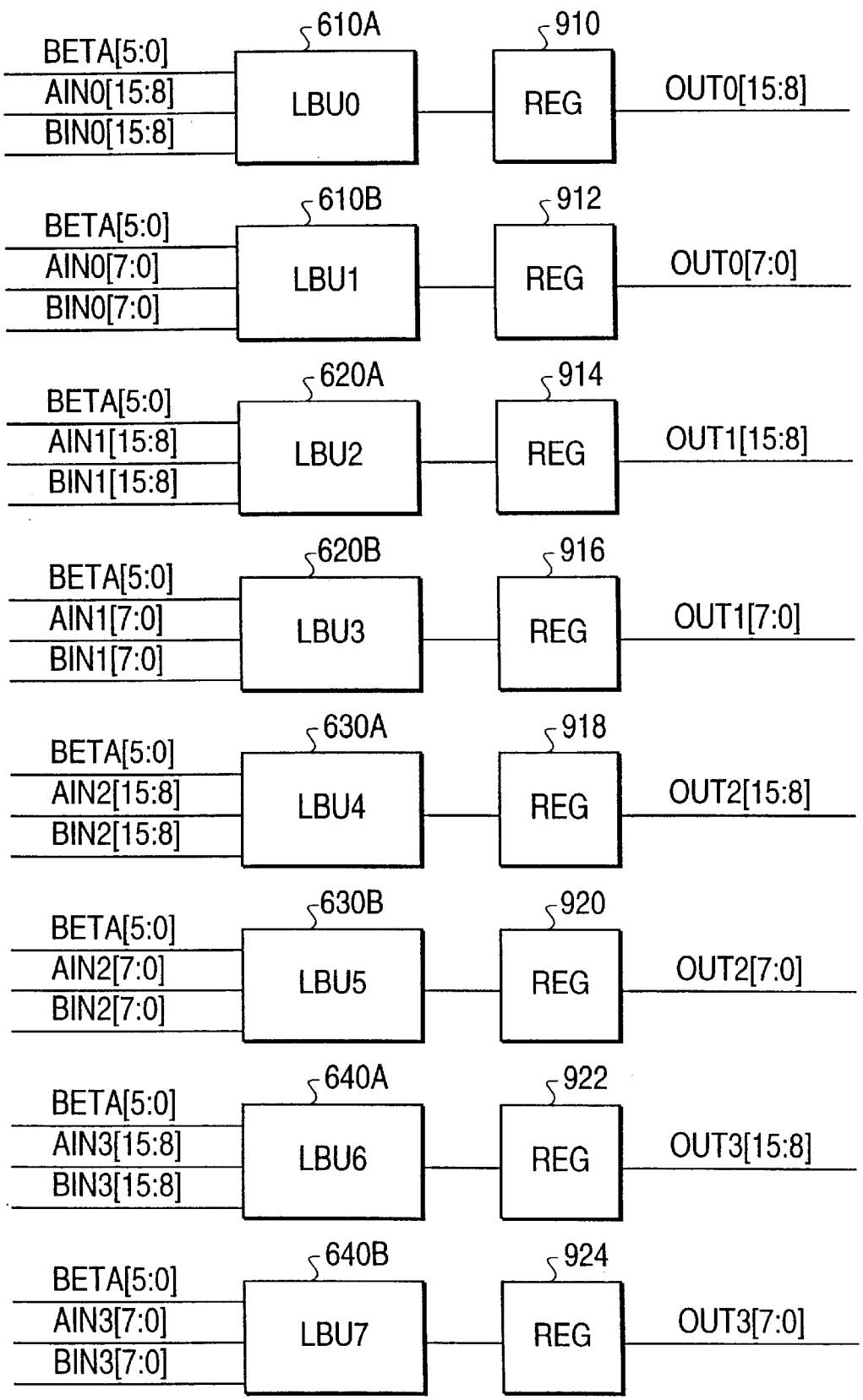
FIG. 9 illustrates a filter configuration diagram of an example shared filter module when configured for operation in Overlay YUV mode according to an embodiment of the present invention.

FIG. 9 illustrates a filter configuration diagram of an example shared filter module when configured for operation in Overlay YUV mode according to an embodiment of the present invention. As shown in FIG. 9, all dual linear blend units (LUB0–3) of the shared filter module 500 may be configured as two linear blend units 610A–610C, 620A–620C, 630A–630C and 640A–640C for linear blending A & B data input from the overlay engine 336 to approximate perspective correct shading value of a 3D triangular surface for a 88 resolution format. Single LUB8 may not be used. Registers 910–924 may be provided to control operation of the filter configuration.

Figure 10:
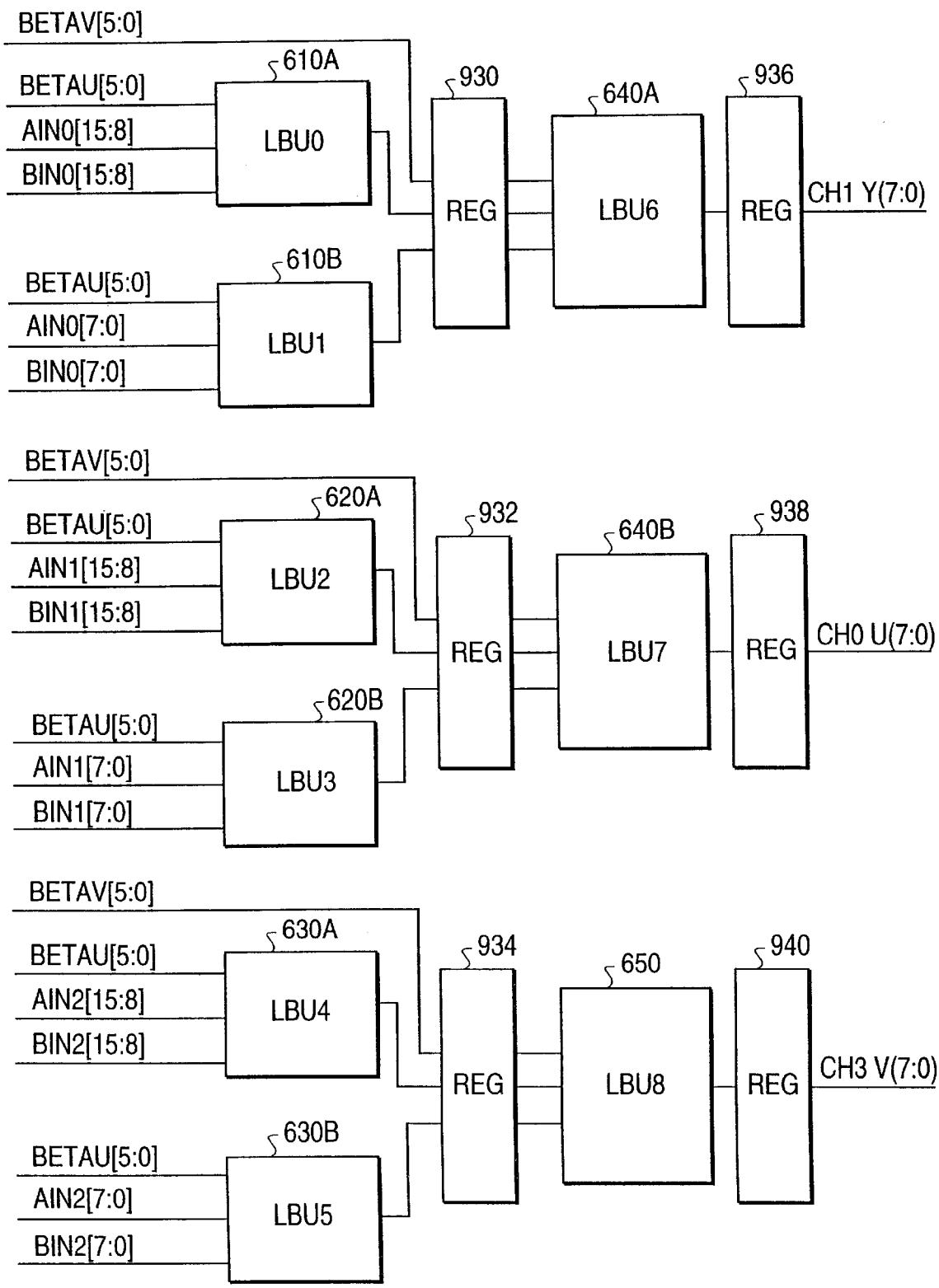
FIG. 10 illustrates a filter configuration diagram of an example shared filter when configured for operation in Overlay YUV 4:2:2 mode according to an embodiment of the present invention.

FIG. 10 illustrates a filter configuration diagram of an example shared filter when configured for operation in Overlay YUV 4:2:0/4:2:2 mode according to an embodiment of the present invention. YUV 4:2:0 is a planar format typically used for digital playback since planar YUV 4:2:0 format requires less bandwidth. In contrast to YUV 4:2:0, YUV 4:2:2 is a packed or interleaved format used for graphics generation and video processing since YUV 4:2:2 format provides a more detailed, richer display. As shown in FIG. 10, all dual linear blend units (LUB0–3) of the shared filter module 500 may be configured as two linear blend units 610A–610B, 620A–620B, 630A–630B and 640A–640B for bi-linear filtering of A & B data input from the mapping engine cache 410 to approximate perspective correct shading value of a 3D triangular surface for a 88 resolution format. Registers 930–940 may be provided to control operation of the filter configuration.

FIG. 11 illustrates a block diagram of an example dual linear blend unit (LBU) for use in an example shared filter module 500 according to an embodiment of the present invention. As described previously, the dual linear blend unit (LBU) may be designed to support two data formats, 565 and 88 configurations. As a result, a single combined interpolator may be all that is required to interpolate color values to approximate perspective correct shading value of a 3D triangular surface of both a 565 resolution format and an 88 resolution format. Such use of a single interpolator eliminates the need to create separate calculation units for each bit resolution of linear interpolations. As shown in FIG. 11, the LBU unit may be partitioned into four calculation units, two high order 5 bit and 3 bit calculation units 1100 and 1110, and two low order 5 bit and 3 bit calculation units 1120 and 1130. Adders 1140–1170, 1190 and 1210, multiplexers 1180, 1200 and 1230, and rounding circuitry 1220 may be provided to create a high order 8 bit precision calculation, a low order 8 bit precision calculation and a middle 6 bit calculation.

Using the above partitioning, the high order 5 bit calculation unit 1100 can be shifted right by three positions and added to the high order 3 bit calculation unit 1110 by the adders 1140 and 1150 to create a high order 8 bit precision calculation. Likewise, the low order 3 bit calculation unit 1120 can be shifted right five positions and added to the low order 5 bit calculation unit 1130 to create a low order 8 bit precision calculation. For 565 resolutions the high and low order 5 bit calculation units 1100 and 1130 are passed through unchanged and the high order 3 bit calculation unit 1110 is shifted right three positions and added to the low order 3 bit calculation unit 1120 to create the middle 6 bit calculation. The final carry addition sends data to the mode select multiplexer 1230 for either a 565 or 88 formatting. Reconfiguration of the 3 and 5 bit calculation units 1100, 1110, 1120, 1130 may be achieved by the multiplexers 1180, 1200 and 1230 controlled from a 565/88 configuration bit. Rounding circuitry 1220 is provided to round away from zero with signed data.

As described from the foregoing, the present invention advantageously provides a shared filter module designed with minimal hardware for providing commonly shared filter resource between an overlay engine and a 3D (texture mapping) engine in order to eliminate the need to create separate 2D and 3D arithmetic circuits for the 2D overlay stretch blit and the 3D texture cache functions, and separate linear interpolators for different data formats for multiple color resolutions.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the present invention is applicable to all types of computer systems and video consumer electronics (CE) devices, including, but not limited to, high definition TV (HDTV), video games, video imaging devices and video disks. The present invention is also applicable for all types of compressed video data stream in different formats, and need not be limited to the computer system 100 as shown in FIG. 1, but can be adapted to other video processing devices and systems. Many modifications may be made to adapt the teachings of the present invention to a particular situation without departing from the scope thereof Therefore, it is intended that the present invention not be limited to the various exemplary embodiments disclosed, but that the present invention includes all embodiments falling within the scope of the appended claims.

What is claimed is:

1. A configurable filter module for providing shared filter resource between an overlay engine and a texture mapping engine of a graphics system, comprising:

a plurality of linear blend units to receive data input from one of an overlay engine and a mapping engine cache; and a filter output multiplexer to receive data output from the linear blend units and select a proper byte ordering output, wherein said linear blend units serve as an overlay interpolator filter to perform linear blending of the data input from the overlay engine during a linear blend mode, and serve as a texture bilinear filter to perform bilinear filtering of the data input from the mapping engine cache during a bilinear filtering mode.

2. The configurable filter module as claimed in claim 1, wherein said plurality of linear blending units comprise four dual linear blend units provided to support at least two data formats, and a single linear blend unit provided to support only one data format.

3. The configurable filter module as claimed in claim 2, wherein said dual linear blend units are configured as either two split linear blend units or three split linear blend units and include associated circuitry to support both data formats under control of a filter select signal.

4. The configurable filter module as claimed in claim 3, wherein said linear blending is accomplished on pixels using the equation A+alpha(B-A), where A represents 2-dimensional pixel data from the overlay engine indicating overlay surface A, B represents 2-dimensional data from the overlay engine indicating overlay surface B, and alpha represents a blending coefficient.

5. The configurable filter module as claimed in claim 3, wherein said bilinear filtering is accomplished on texels using the equation: C=C1(1-.u)(1-.v)+C2(.u(1-.v))+C3 (.u*.v)+C4(1.u)*.v, where C1, C2,C3 and C4 represent 3-dimentional texel data from the mapping engine cache indicating four adjacent texels of locations U-V, U+1-V, U-V+1 and U+1-V+1, and where values .u and .v indicate fractional locations within the C1, C2, C3, C4 texels.

6. The configurable filter module as claimed in claim 3, wherein requests from the overlay engine for overlay interpolation take precedence over requests from the mapping engine cache.

7. The configurable filter module as claimed in claim 1, wherein said linear blend units can be configured as one of eight 8-bit linear interpolators, three 8-bit bi-linear interpolators and four 565 bi-linear interpolators to perform either said linear blending or said bilinear filtering of data input from respective overlay engine and mapping engine cache.

8. The configurable filter module as claimed in claim 1, wherein said linear blend units are configured as a combination of three thrice-split linear blend units, a twice-split linear blend unit and a single linear blend unit for bilinear filtering data input from the mapping engine cache to approximate perspective correct shading value of a 3-dimensional triangular surface for different resolution formats.

9. The configurable filter module as claimed in claim 1, wherein said linear blend units are configured as four thrice-split linear blend units arranged in parallel for linear blending data input from the overlay engine to approximate perspective correct shading value of a 3-dimensional triangular surface for different resolution formats.

10. The configurable filter module as claimed in claim 1, wherein said linear blend units are configured as a combination of four dual linear blend units and a single linear blend unit arranged in parallel for bilinear filtering data input from the mapping engine cache to approximate perspective correct shading value of a 3-dimensional triangular surface for different resolution formats.

11. The configurable filter module as claimed in claim 1, wherein each of said linear blend units act as a single interpolator to calculate multiple color resolutions of different data format precision, and comprises:
a high order 5-bit calculation unit arranged to shift data input from left to right by three bit positions;
a high order 3-bit calculation unit arranged to shift data input from left to right by five bit positions;
first adders arranged to add outputs from the high order 5-bit and 3-bit calculation units to create a high order 8-bit precision calculation;
a low order 3-bit calculation unit arranged to shift data input from left to right by five bit positions;
a low order 5-bit calculation unit arranged to shift data input from left to right by three bit positions;
second adders arranged to add outputs from the low order 5-bit and 3-bit calculation units to create a low order 8-bit precision calculation; and
means for calculating multple color resolutions of different data format precision based on said high order 8-bit precision calculation and said low order 8-bit precision calculation.

12. A graphics controller for processing video data comprising:
a 3D engine which performs 3D graphics functions, including creating a rasterized 2D display image from representation of 3D;
a 2D engine which performs 2D graphics functions and includes a blitter (BLT) engine and an arithmetic stretch blitter (BLT) engine for performing fixed blitter and stretch blitter (BLT) operations; and
a display engine which enables a visual display of video or graphics images and includes an overlay engine for merging either video data captured from a video source or data delivered from the 2D engine with graphics data for said visual display;
wherein said 3D engine comprises: a mapping engine cache which provides 3D data, a configurable filter which shares filter resource with said 2D engine via said overlay engine to perform either linear blending of 2D data input from said 2D engine via said overlay engine during a linear blend mode or bilinear filtering of 3D data input from said mapping engine cache during a bilinear filtering mode, and a color calculator which handles color calculations of texel maps for said visual display.

13. The graphics controller as claimed in claim 12, wherein said 3D engine also performs a variety of functions including perspective-correct texture mapping to deliver 3D graphics, bilinear and anisotropic filtering, MIP mapping to reduce blockiness and enhance image quality, Gouraud shading, alpha-blending, fogging and Z-buffering.

14. The graphics controller as claimed in claim 12, wherein said display engine further comprises:
a hardware motion compensation module which performs motion compensation;
a hardware cursor which provides cursor patterns; and
a digital-to-analog converter (DAC) which converts digital video to analog video signals for said visual display on a display monitor.

15. The graphics controller as claimed in claim 12, wherein said 3D engine further comprises:
a color space converter which receives YUV data and converts into RGB data, where YUV represents color-difference video data containing one luminance component (Y) and two chrominance components (U, V), and RGB represents composite video data containing red (R), green (G) and blue (B) components of an image;
an anisotropic filter which sums four pixels from different levels-of-detail (LOD) levels to produce an average of four LOD levels;
a dithering unit which reads dither weights from a table and sums the dither weights with the current pixel data received from the anisotropic filter;
a re-ordering FIFO which sorts pixels for the proper output format; and
a motion compensation unit which averages successive pixels, sums an error term with the averaged result, and sends data to the color calculator for handling final color calculations before rendering on said display monitor.

16. The graphics controller as claimed in claim 12, wherein said configurable filter comprises:
a plurality of linear blend units each of which receives data input from one of said overlay engine and said mapping engine cache, and generates a linear blend filter output respectively; and a filter output multiplexer which receives data output from the linear blend units and selects a proper byte ordering output, wherein said linear blend units serve as an overlay interpolator filter to perform said linear blending of the data input from said overlay engine during a linear blend mode, and serve as a texture bilinear filter to perform said bilinear filtering of the data input from said mapping engine cache during a bilinear filtering mode.

17. The graphics controller as claimed in claim 16, wherein said plurality of linear blending units comprise four dual linear blend units provided to support at least two data formats, and a single linear blend unit provided to support only one data format.

18. The graphics controller as claimed in claim 16, wherein said dual linear blend units are configured as either two split linear blend units or three split linear blend units and include associated circuitry to support both data formats under control of a filter select signal.

19. The graphics controller as claimed in claim 16, wherein said linear blending is accomplished on pixels using the equation A+alpha(B-A), where A represents 2-dimensional pixel data from the overlay engine indicating overlay surface A, B represents 2-dimensional data from the overlay engine indicating overlay surface B, and alpha represents a blending coefficient.

20. The graphics controller as claimed in claim 16, wherein said bilinear filtering is accomplished on texels using the equation: C=C1(1-.u)(1-.v)+C2(.u(1-.v))+C3(.u*.v)+C4(1-.u) *.v, where C1, C2,C3 and C4 represent 3-dimentional texel data from the mapping engine cache indicating four adjacent texels of locations U-V, U+1-V, U-V+1 and U+1-V+1, and where values .u and .v indicate fractional locations within the C1, C2, C3, C4 texels.

21. The graphics controller as claimed in claim 16, wherein requests from said overlay engine for overlay interpolation take precedence over requests from said mapping engine cache.

22. The graphics controller as claimed in claim 16, wherein said linear blend units can be configured as one of eight 8-bit linear interpolators, three 8-bit bi-linear interpolators and four 565 bi-linear interpolators to perform either said linear blending or said bilinear filtering of data input from respective overlay engine and mapping engine cache.

23. The graphics controller as claimed in claim 16, wherein said linear blend units are configured as a combination of three thrice-split linear blend units, a twice-split linear blend unit and a single linear blend unit for bilinear filtering data input from said mapping engine cache to approximate perspective correct shading value of a 3-dimensional triangular surface for different resolution formats.

24. The graphics controller as claimed in claim 16, wherein said linear blend units are configured as four thrice-split linear blend units arranged in parallel for linear blending data input from said overlay engine to approximate perspective correct shading value of a 3-dimensional triangular surface for different resolution formats.

25. The graphics controller as claimed in claim 16, wherein said linear blend units are configured as a combination of four dual linear blend units and a single linear blend unit arranged in parallel for bilinear filtering data input from said mapping engine cache to approximate perspective correct shading value of a 3-dimensional triangular surface for different resolution formats.

26. The graphics controller as claimed in claim 16, wherein each of said linear blend units act as a single interpolator to calculate multiple color resolutions of different data format precision, and comprises:

a high order 5-bit calculation unit arranged to shift data input from left to right by three bit positions;

a high order 3-bit calculation unit arranged to shift data input from left to right by five bit positions;

first adders arranged to add outputs from the high order 5-bit and 3-bit calculation units to create a high order 8-bit precision calculation;

a low order 3-bit calculation unit arranged to shift data input from left to right by five bit positions;

a low order 5-bit calculation unit arranged to shift data input from left to right by three bit positions;

second adders arranged to add outputs from the low order 5-bit and 3-bit calculation units to create a low order 8-bit precision calculation; and means for calculating multple color resolutions of different data format precision based on said high order 8-bit precision calculation and said low order 8-bit precision calculation.

27. A method for providing shared filter functionality between an overlay engine and a texture mapping engine in a graphics system to process video data comprising:

receiving video data from one of said overlay engine and said texture mapping engine;

configuring a plurality of linear blend units as either an overlay interpolator filter to perform linear blending of said video data input from said overlay engine or a bilinear texture filter to perform bilinear filtering of said video data input from said texture mapping engine; and determining filter color values to approximate perspective shading of a 3D triangular surface of an image in different resolution formats.

28. The method as claimed in claim 27, wherein said linear blending is accomplished on pixels using the equation A+alpha(B-A), where A represents 2-dimensional pixel data from said overlay engine indicating overlay surface A, B represents 2-dimensional data from said overlay engine indicating overlay surface B, and alpha represents a blending coefficient.

29. The method as claimed in claim 27, wherein said bilinear filtering is accomplished on texels using the equation: C=C1(1-.u)(1-.v)+C2(.u(1-.v))+C3(.u*.v)+C4(1-.u) *.v, where C1, C2,C3 and C4 represent 3-dimentional texel data from said texture mapping engine indicating four adjacent texels of locations U-V, U+1-V, U-V+1 and U+1-V+1, and where values .u and .v indicate fractional locations within the C1, C2, C3, C4 texels.

30. The method as claimed in claim 27, wherein requests from said overlay engine for overlay interpolation take precedence over requests from said texture mapping engine.

31. The method as claimed in claim 27, wherein said linear blend units can be configured as one of eight 8-bit linear interpolators, three 8-bit bi-linear interpolators and four 565 bi-linear interpolators to perform either said linear blending or said bilinear filtering of data input from respective overlay engine and texture mapping engine.

32. The method as claimed in claim 27, wherein said linear blend units are configured as a combination of three thrice-split linear blend units, a twice-split linear blend unit and a single linear blend unit for bilinear filtering vide data input from said texture mapping engine to approximate perspective correct shading value of a 3-dimensional triangular surface for different resolution formats.

33. The method as claimed in claim 27, wherein said linear blend units are configured as four thrice-split linear blend units arranged in parallel for linear blending video data input from said overlay engine to approximate perspective correct shading value of a 3-dimensional triangular surface for different resolution formats.

34. The method as claimed in claim 27, wherein said linear blend units are configured as a combination of four dual linear blend units and a single linear blend unit arranged in parallel for bilinear filtering video data input from said texture mapping engine to approximate perspective correct shading value of a 3-dimensional triangular surface for different resolution formats.

35. A graphics controller including a two-dimensional (2D) engine and a three-dimensional (3D) engine for processing data for a visual display, comprising:
 an overlay engine to provide 2D data from the 2D engine;
 a mapping engine cache to provide 3D data from the 3D engine; and
 a configurable filter to provide shared filter resources and to perform linear blending of 2D data from said 2D engine via said overlay engine, or bilinear filtering of 3D data from said mapping engine cache for subsequent visual display.

36. The graphics controller as claimed in claim 35, wherein:
 said 2D engine performs 2D graphics functions and includes a blitter (BLT) engine and an arithmetic stretch blitter (BLT) engine for performing fixed blitter and stretch blitter (BLT) operations; and
 said 3D engine performs 3D graphics functions, including creating a rasterized 2D display image from representation of 3D.

37. The graphics controller as claimed in claim 36, wherein said 3D engine also performs a variety of functions including perspective-correct texture mapping to deliver 3D graphics, bilinear and anisotropic filtering, MIP mapping to reduce blockiness and enhance image quality, Gouraud shading, alpha-blending, fogging and Z-buffering.

38. The graphics controller as claimed in claim 35, wherein said overlay engine is included in a display engine for merging either data captured from a video source or data delivered from said 2D engine with graphics for said visual display, said display engine further comprising:
 a hardware motion compensation module to perform motion compensation;
 a hardware cursor to provide cursor patterns; and
 a digital-to-analog converter (DAC) to convert digital video to analog video signals for said visual display on a display monitor.

39. The graphics controller as claimed in claim 36, wherein said 3D engine further comprises:
 a color space converter to receive YUV data and convert into RGB data, where YUV represents color-difference video data containing one luminance component (Y) and two chrominance components (U, V), and RGB represents composite video data containing red (R), green (G) and blue (B) components of an image;
 an anisotropic filter to combine pixels from different levels-of-detail (LOD) levels to produce an average of four LOD levels;
 a dithering unit to read dither weights from a table and sum the dither weights with the current pixel data received from the anisotropic filter;
 a re-ordering FIFO to sort pixels for the proper output format; and
 a motion compensation unit to average successive pixels, sum an error term with the averaged result, and send data for final color calculations before rendering on said display monitor.

40. The graphics controller as claimed in claim 36, wherein said configurable filter comprises:
 a plurality of linear blend units to receive data input from one of said overlay engine and said mapping engine cache; and
 a filter output multiplexer to receive data output from the linear blend units and select a proper byte ordering output,
 wherein said linear blend units serve as an overlay interpolator filter to perform said linear blending of the data input from said overlay engine during a linear blend mode, and serve as a texture bilinear filter to perform said bilinear filtering of the data input from said mapping engine cache during a bilinear filtering mode.

41. The graphics controller as claimed in claim 40, wherein said plurality of linear blending units comprise four dual linear blend units provided to support at least two data formats, and a single linear blend unit provided to support only one data format.

42. The graphics controller as claimed in claim 40, wherein said dual linear blend units are configured as either two split linear blend units or three split linear blend units and include associated circuitry to support both data formats under control of a filter select signal.

43. The graphics controller as claimed in claim 40, wherein said linear blending is accomplished on pixels using the equation A+alpha(B-A), where A represents 2-dimensional pixel data from the overlay engine indicating overlay surface A, B represents 2-dimensional data from the overlay engine indicating overlay surface B, and alpha represents a blending coefficient.

44. The graphics controller as claimed in claim 40, wherein said bilinear filtering is accomplished on texels using the equation: C=C1(1-.u)(1-.v)+C2(.u(1-.v))+C3(.u*.v)+C4(1-.u)*.v, where C1, C2,C3 and C4 represent 3-dimensional texel data from the mapping engine cache indicating four adjacent texels of locations U-V, U+1-V, U-V+1 and U+1-V+1, and where values .u and .v indicate fractional locations within the C1, C2, C3, C4 texels.

45. The graphics controller as claimed in claim 40, wherein requests from said overlay engine for overlay interpolation take precedence over requests from said mapping engine cache.

46. The graphics controller as claimed in claim 40, wherein said linear blend units can be configured as one of eight 8-bit linear interpolators, three 8-bit bi-linear interpolators and four 565 bi-linear interpolators to perform either said linear blending or said bilinear filtering of data input from respective overlay engine and mapping engine cache.

47. The graphics controller as claimed in claim 40, wherein said linear blend units are configured as a combination of three thrice-split linear blend units, a twice-split linear blend unit and a single linear blend unit for bilinear filtering data input from said mapping engine cache to approximate perspective correct shading value of a 3-dimensional triangular surface for different resolution formats.

48. The graphics controller as claimed in claim 40, wherein said linear blend units are configured as four thrice-split linear blend units arranged in parallel for linear blending data input from said overlay engine to approximate perspective correct shading value of a 3-dimensional triangular surface for different resolution formats.

49. The graphics controller as claimed in claim 40, wherein said linear blend units are configured as a combination of four dual linear blend units and a single linear blend unit arranged in parallel for bilinear filtering data input from said mapping engine cache to approximate perspective correct shading value of a 3-dimensional triangular surface for different resolution formats.

50. The graphics controller as claimed in claim 40, wherein each of said linear blend units act as a single interpolator to calculate multiple color resolutions of different data format precision, and comprises:

a high order 5-bit calculation unit arranged to shift data input from left to right by three bit positions;

a high order 3-bit calculation unit arranged to shift data input from left to right by five bit positions;

first adders arranged to add outputs from the high order 5-bit and 3-bit calculation units to create a high order 8-bit precision calculation;

a low order 3-bit calculation unit arranged to shift data input from left to right by five bit positions;

a low order 5-bit calculation unit arranged to shift data input from left to right by three bit positions;

second adders arranged to add outputs from the low order 5-bit and 3-bit calculation units to create a low order 8-bit precision calculation; and means for calculating multiple color resolutions of different data format precision based on said high order 8-bit precision calculation and said low order 8-bit precision calculation.

* * * * *